May 10, 1927.
A. D. McTIGHE
1,628,053
WINDOW VENTILATOR FOR AUTOMOBILES AND THE LIKE
Filed April 3, 1926
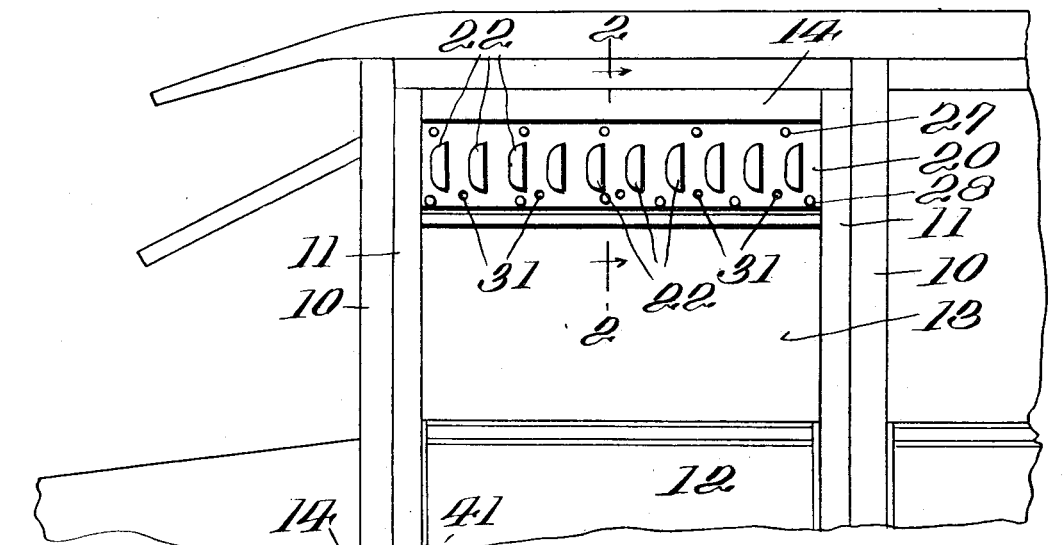
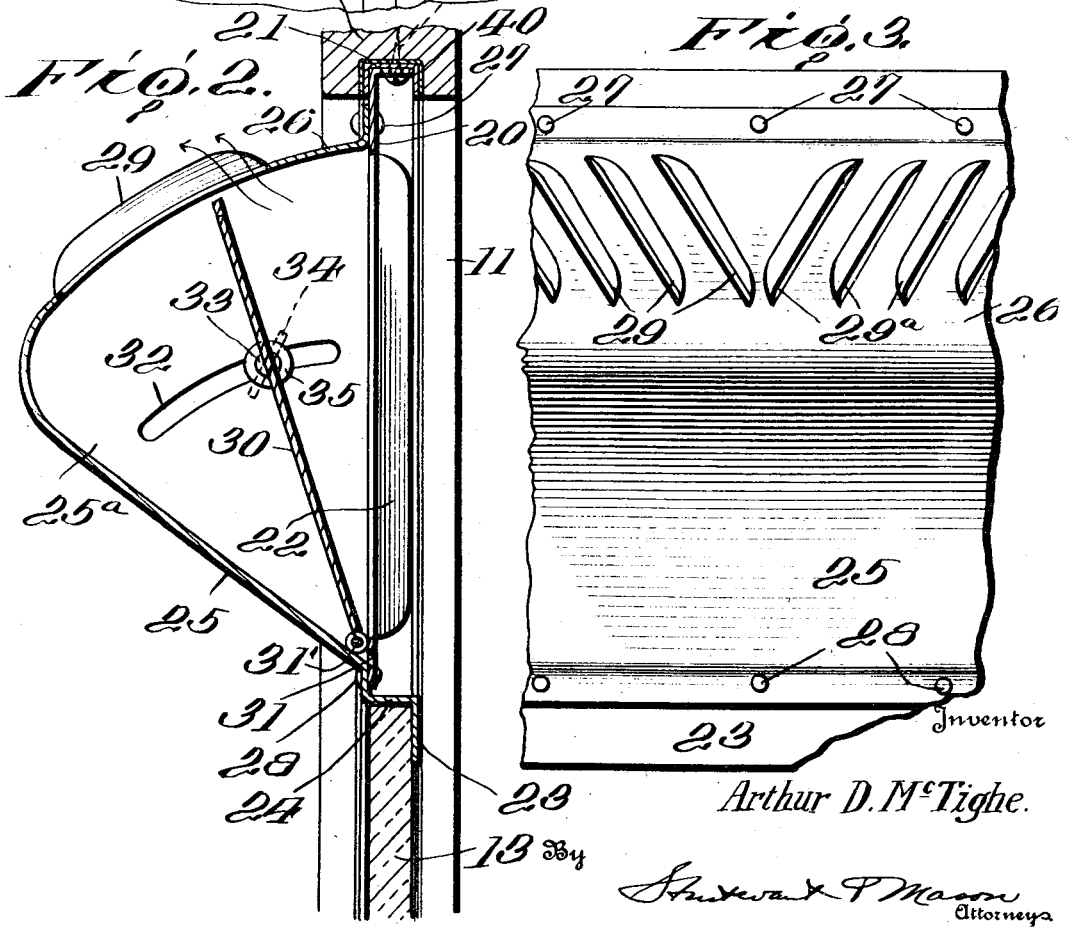
Arthur D. McTighe.

Patented May 10, 1927.

1,628,053

UNITED STATES PATENT OFFICE.

ARTHUR D. McTIGHE, OF TRENTON JUNCTION, NEW JERSEY.

WINDOW VENTILATOR FOR AUTOMOBILES AND THE LIKE.

Application filed April 3, 1926. Serial No. 99,582.

This invention relates to an improved construction of ventilator for the windows of automobiles and for like purposes, and more particularly concerns such a ventilator of the removable type which may be inserted in the sash opening and held between the sash and the end of the frame.

It has heretofore been proposed to provide window ventilators of this type; but such previous constructions were cumbersome and heavy, could not be positioned and removed easily, and when employed upon automobiles, permitted the entrance of snow and rain into the interior of the vehicle.

As distinguished from such structures, one of the objects of the present invention is to provide a simple and easily constructed device which may be readily adjusted to regulate the rate of ventilation. A further object is to provide such a structure with means whereby the blasts of air from the exterior are moderated, so as to prevent drafts from the ventilator when in use, no matter what may be the speed of the vehicle upon which it is placed or of the wind which may encounter it.

Further objects are to provide means to facilitate drainage of any rain or snow which may enter the body of the device itself.

Figure 1 is a conventional showing of the side of an automobile with the device in place in the door sash.

Fig. 2 is a section of the device substantially on line 2—2 of Fig. 1.

Fig. 3 is a view of a section of the device from the interior of the vehicle.

On these drawings, the automobile is represented as provided with posts 10, 10 to support the door frame 11, which has the rear panel 12 to receive the sliding sash 13, which is customarily a pane of plate glass without a surrounding frame. The top part of the frame 14 connects the side bars 11 in known manner.

The ventilator according to this invention is comprised of a casing and a regulating shutter. The casing has the front plate 20 which at its top is turned over to form a flange 21. This plate 20 has a number of louvres 22 formed therein by cutting the material on a line and forcing the material at one side of the gash out of plane, in known manner. These louvres 22 are so arranged that their openings are respectively toward the front or rear of the vehicle on the opposite sides thereof: that represented in the drawing is on the left side of the vehicle, and has its openings directed rearwardly, and the corresponding device on the right-hand side of the vehicle will have its louvre openings directed forwardly, so that the air enters the vehicle at the right and leaves at the left to produce a cross-flow which may be regulated in amount by the shutters, if need be.

The rear portion of the casing, or that disposed within the vehicle, is formed of a similar sheet of metal which has the bottom facing portion 23 which fits tightly against the outer side of the window pane 13 and is connected to the flange 24 which fits on the top of the window pane. The material extends upwardly and rearwardly from the flange 24 at an acute angle to form a rear closing wall 25. This rear wall merges by a curved portion into an arcuate upper wall 26 which has its center of curvature substantially at the lower point of juncture of the rear wall 25 and the face plate 20. This top wall 26 is continued upwardly in parallelism with the upper part of the face plate 20 and is connected thereto to form a sealed joint, for example by welding or the rivets 27. A similar joint, e. g. the rivets 28, is employed at the bottom of the device to connect the face plate 20 with the rear wall 25. End walls such as 25ª are formed with the rear plate to constitute a closed casing.

On the top wall 26 are provided a number of louvres 29 and 29ª which are inclined to the normal vertical plane and faced in opposite directions at the two ends of the device, so that the air is distributed through the vehicle and does not produce a draft therein.

A shutter plate 30 is provided at its lower end with projecting fingers which are curled about a guide wire 31', and which constitute a pivot point for the shutter 30 when the latter is placed loosely in the space between the front and rear plates of the casing. The gaps between the fingers permit a free flow of rain or melting snow past the lower end of the shutter plate into the angle formed by the front plate 20 and the rear plate 25, from which the water may escape to the exterior of the vehicle through the drain openings 31.

This shutter plate 30 being pivoted at substantially the center of curvature of the top plate 26, and being of a length substantially equal to this radius of curvature, is intended for regulating the effective area of passage afforded the air from the portion of the casing between the shutter 30 and the front plate 20 and through the apertures in the louvres 29 and 29ᵃ. For this purpose a slot 32 is provided in the end wall 25ᵃ of the casing, through which extends a threaded stem 33 which is fastened rigidly to the shutter 30. A butterfly nut 34 is threaded upon this stem and by pressing the washer 35 against the outer side of the casing end 25ᵃ serves to lock the shutter 30 in any desired position. For example, in the position shown the area afforded for passage of air is that indicated by the two arrows, and no more. If the stem 33 be moved to the outer or right hand end of the slot 32 in Fig 2, the flow of air through the device is substantially shut off; if the stem 33 be moved to the inward or left hand end of the slot 32 in Fig. 2, the flow is at a maximum and air is permitted to pass for the entire length of the respective louvres 29.

The device may be placed in position by lowering the window pane 13 and placing the upper flange 21 of the device in position in the usual groove in the top bar 14 of the door frame. This groove is represented as having the felt packing strips 40 therein, and, in the particular instance, screws 41 are employed to hold the device in position, but it will be understood that this is merely a preferred arrangement when it is desired to leave the device in position for a considerable period of time, and to have the capacity of opening the window pane 13 therebelow, for signalling or direct ventilation. The window pane 13 may be returned into engaging relation with the portions 23 and 24 of the casing, which is then held rigidly in position, and rain and snow are prevented from driving through the opening.

It is obvious that the invention is not limited to the precise form represented, but may be modified within the scope of the appended claims.

I claim:

1. In a window ventilator, a front panel having louvres formed therein and an upper flange adapted to be received within the window frame, a rear plate having a flange adapted to be fitted upon the window sash and providing an upper arcuate wall, means to connect said plates together, said arcuate upper wall having its center of curvature substantially at the lower juncture of the said plates, a shutter located between said plates and pivoted substantially at the center of curvature of said upper wall, said upper wall having a plurality of louvres therein extending at an angle to the upper flange of the device, said shutter closing selected portions of the areas of said louvres, and means for adjusting and holding said shutter in adjusted position from the exterior of said casing.

2. In a window ventilator, a casing of triangular section with face, rear and top walls, said face and top walls having louvre openings therein, means formed integrally with said rear wall to support said device in sealing relation in a window opening, a shutter in said casing extending from its lower corner substantially to the top thereof, and means connected to said shutter and passing to the exterior of said casing for adjusting and securing said shutter at various angles with respect to said face wall, said shutter constituting a baffle and being swept by an entering air current for substantially its length, whereby said current will deposit its moisture to flow down the shutter to the lower corner of said casing.

3. In a ventilating system for automobiles having window openings at opposite sides thereof, a casing of triangular section in and filling each of said openings, said casings having face, rear and top walls, said face walls being located toward the exterior of the vehicle and having openings therein respectively directed to the front and the rear of the vehicle, each of said top walls having louvres therein directed both to the front and rear, and a shutter in said casing to regulate the air flow through the top louvre openings.

4. In a window ventilator, a casing of triangular section having face, rear and top walls, said face and rear walls being joined at an acute angle at the bottom, said face and top walls having openings therein, a shutter free in said casing and having a curled lower edge to form a trunnion to rest freely and rock at said angle, said curled edge having cut-away portions for the passage of water from said shutter into the extremity of said angle, said face wall having drainage apertures at said angle, and means to move and adjust said shutter to regulate the airflow through the openings in the top wall.

In testimony whereof, I affix my signature.

ARTHUR D. McTIGHE.